United States Patent [19]

Shoji et al.

[11] Patent Number: 5,253,081
[45] Date of Patent: Oct. 12, 1993

[54] IMAGE RECORDING DEVICE

[75] Inventors: Tsuyoshi Shoji, Tokyo; Toshiharu Yumoto; Takashi Sakata, both of Nagano, all of Japan

[73] Assignee: Fuji Photo Film Co., Ltd., Kanagawa, Japan

[21] Appl. No.: 808,929

[22] Filed: Dec. 18, 1991

[30] Foreign Application Priority Data

Dec. 20, 1990 [JP] Japan ................................. 2-404570

[51] Int. Cl.$^5$ ..................... H04N 1/21; H04N 1/387
[52] U.S. Cl. .................................. 358/450; 358/444; 395/116
[58] Field of Search .............. 358/450, 451, 453, 452, 358/448, 296, 444, 431, 401; 340/721, 799; 395/115, 116

[56] References Cited

U.S. PATENT DOCUMENTS 4,672,462  6/1987 Yamada ................................. 358/450

FOREIGN PATENT DOCUMENTS 234662 10/1966 Japan .

Primary Examiner—Edward L. Coles, Sr.
Assistant Examiner—Scott A. Rogers
Attorney, Agent, or Firm—Sughrue, Mion, Zinn, Macpeak & Seas

[57] ABSTRACT

Disclosed herein is an image recording device for recording a plurality of images on a single recording medium. The image recording device basically comprises a frame memory for storing input image data therein, a setting device for specifying image attribute information and image arrangement information on the recording medium, a line buffer memory for storing therein image data read from the frame memory, a dot-number counter for counting down a read clock of the frame memory in response to the number of margin dots preset thereto, a white image data storing device for storing white image data in the line buffer memory in synchronism with the read clock until the count of the dot-number counter reaches zero after the dot-number counter has started to count, an address counter for counting up the read clock in response to an image read start address preset thereto when the count of the dot-number counter has reached zero, thereby specifying an address for reading image data corresponding to each line with respect to each image from the frame memory, and a write control device for storing, at one address of the frame memory, image data corresponding to one horizontal scanning period with respect to one image.

4 Claims, 4 Drawing Sheets

IMAGE RECORDING DEVICE

BACKGROUND OF THE INVENTION

1. Field of the Invention

The present invention relates to an image recording device for recording a plurality of images on a single recording medium.

2. Description of the Related Art

There has heretofore been known an image recording device which is capable of recording, on a single recording medium, either a plurality of images based on image signals produced from a single signal source or a plurality of images based on image signals produced from a plurality of signal sources, which signals being exactly similar to one another in attributes such as the number of scanning lines, the aspect ratio, etc.

Let's now consider images of patient's parts to be diagnosed for medical care, for example. In this case, it is often convenient for the diagnosis if images of the identical part of the same patient, which are produced from different diagnosis devices, are disposed adjacent to one another and monitor display for the processing of diagnosed images and data are disposed adjacent to one another. The conventional image recording device referred to above has, however, the problem that when the images whose signals are different in kind or attribute from one another are recorded on different recording mediums respectively, exact diagnosis is rendered difficult and the number of recording mediums on which diagnosed images are recorded are increased.

SUMMARY OF THE INVENTION

It is a principal object of the present invention to provide an image recording device capable of contiguously recording a plurality of images based on image signals, which are different in size and scanning form from one another, on the same recording medium.

It is another object of the present invention to provide an image recording device for receiving successively-input image data therein so as to record a plurality of images based on the received image data on a single recording medium, the image recording device comprising, a frame memory for storing the input image data therein, specifying means for specifying information about attributes of the image data and image arrangement information on the recording medium, a line buffer memory for storing therein image data read from the frame memory, a dot-number counter for counting down a read clock of the frame memory in response to the number of margin dots preset thereto based on the attribute information and the image arrangement information specified by the specifying means before image data corresponding to each line with respect to an image specified at the leftmost position on the recording medium is read from the frame memory and/or after image data of the read image data, which corresponds to each line with respect to each image, has been written into the line buffer memory, white image data storing means for storing white image data in the line buffer memory in synchronism with the read clock of the frame memory until the count of the dot-number counter reaches zero after the dot-number counter has started counting, and an address counter for counting up the read clock in response to an image read start address preset thereto when the count of the dot-number counter has reached zero, so as to specify an address for reading the image data corresponding to each line with respect to each image from the frame memory.

It is a further object of the present invention to provide an image recording device further including write controlling means for storing at one line address of the frame memory, image data corresponding to one horizontal scanning period with respect to each image.

It is a still further object of the present invention to provide an image recording device wherein the frame memory is used to store image data relative to each image therein as a group.

It is a still further object of the present invention to provide an image recording device wherein the number of the margin dots preset to the dot-number counter represents the number of dots corresponding to a left margin on the recording medium and the number of dots corresponding to the width of a space between adjacent images on the recording medium.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
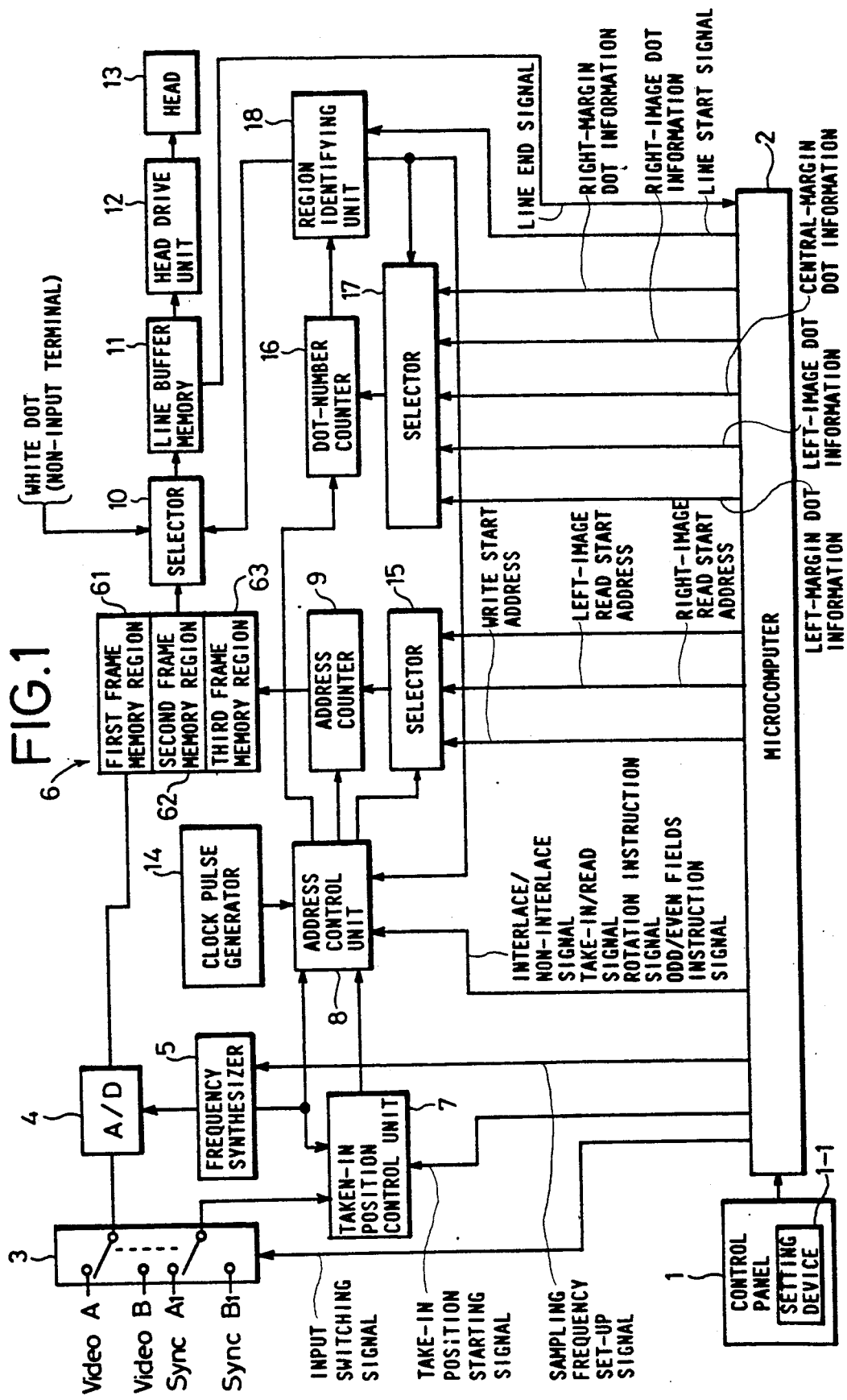
FIG. 1 is a block diagram showing the structure of one embodiment of the present invention.

FIG. 1 is a block diagram showing the structure of one embodiment of the present invention.

Numeral 1 indicates a control panel provided with a setting device 1-1 for setting up or specifying attribute information used to specify image attributes such as the number of scanning lines, the aspect ratio for each input image signal and for setting up or specifying image arrangement information. Each information set up by the control panel 1 is input to a microcomputer 2 which constitutes a part of an image recording device and is used to control the image recording device.

The microcomputer 2 reads attribute information and arrangement information output from the setting device 1—1 of the control panel 1 so as to output an input switching or changeover signal for changing an input image signal to another, an image signal take-in starting signal, a sampling frequency set-up information for an image signal; interlace/non-interlace information, take-in(access)/read information, odd/even fields instruction information on the basis of the input attribute information; rotation instruction information, write start address information, left-and right images or up-and-down images read start address information on the basis of the arrangement information; and information indicative of the number of right-margin dots, information indicative of the number of left-margin dots, information indicative of the number of centrally-extending blank dots, information indicative of the number of right-image dots and information indicative of the number of left-image dots upon the output of images.

Then, image signals A, B and synchronizing signal $A_1$, $B_1$ of the image signals A, B are supplied to a switching circuit 3, which, in turn, outputs image signals and signals synchronized with the image signals in response to an input changeover signal. The image signal A output from the switching circuit 3 is A/D converted by an A/D converter 4. The image signal A thus converted is sampled based on an output, i.e., a sampling clock signal generated from a frequency synthesizer 5 to which a frequency division ratio has been set based on the image sampling frequency set-up information. Then, image data (hereinafter referred to as "A image data") based on the image signal A thus sampled is controlled by an address control unit 8 to be controlled by a take-in position control unit 7 so as to be stored at a corresponding address in a first frame memory region 61 of a frame memory 6, which is specified by an address counter 9 for specifying a rowdirection address and a column-direction address of the frame memory 6. In addition, image data (hereinafter referred to as "B image data") based on the image signal B sampled in the same manner as described above is also stored at a corresponding address in a second frame memory region 62 of the frame memory 6. At this time, addressing is made in such a manner that image data corresponding to one horizontal scanning period is stored at one line address of the frame memory 6. Here, one line address means one address including all the data of one horizontal scanning period.

On the other hand, the take-in position control unit 7 is activated in response to the take-in starting signal output from the microcomputer 2, the synchronizing signal output from the switching circuit 3, and the sampling clock signal output from the frequency synthesizer 5 so as to supply a take-in control signal to the address control unit 8 from the time of inputting of the take-in starting signal and the synchronizing signal thereto. The address control unit 8 receives the sampling clock signal as a write clock pulse and a clock pulse generated from a clock pulse generator 14 as a read clock pulse so as to selectively output them to the address counter 9 in response to the take-in/read signal and to output a control signal to a selector 15. The selector 15 then receives the control signal from the address control unit 8 to select one of the write start address and the right-image and left-image read start addresses at the time of reading, which are supplied from the microcomputer 2 in response to the supply of the interlace/non-interlace signal, the rotation instruction signal and the odd/even fields instruction signal to the address control unit 8, thereby supplying the so-selected address to the address counter 9 as preset data so as to specify a read start address.

Then, one of the image data stored in the frame memory 6 is read from an address specified by the count of the address counter 9 supplied with the output of the clock pulse generator 14. The image data thus read is stored in the line buffer memory 11 through a selector 10. Then, the image data stored in the line buffer memory 11 is read so as to be supplied to a head drive unit 12, which is, in turn, activated to drive a head 13 for thereby thermally recording the image data on a recording medium.

A region identifying unit 18 receives the output of a dot-number counter 16 therein to identify whether or not the output represents any one of a left-margin region, a left-image region, a centrally-extending blank region, a right-image region and a right-margin region, for thereby outputting a control signal to the selector 10 and a selector 17 in response to the output thus identified. If it is determined by the region identifying unit 18 that the output shows the left-margin region, then the selector 17 selects the number of left-margin dots and presets the same to the dot-number counter 16. Then, the dot-number counter 16 counts down a read clock pulse output from the address control unit 8. When the count of the dot-number counter 16 reaches zero, the output of the dot-number counter 16 is identified by the region identifying unit 18 as the left-image region. If it is determined by the region identifying unit 18 that the output represents the left-image region, then the selector 17 selects the number of left-image dots and presets the same to the dot-number counter 16. Then, the dot-number counter 16 counts down the read clock pulse output from the address control unit 8. When the count of the dot-number counter 16 reaches zero, the output referred to above is identified by the region identifying unit 18 as the centrally-extending blank region.

If it is determined by the region identifying unit 18 that the output shows the blank region, then the selector 17 selects the number of centrally-extending blank dots and presets the same to the dot-number counter 16. Then, the dot-number counter 16 counts down the read clock pulse output from the address control unit 8. When the count of 0 is reached, the region identifying unit 18 determines that the output has shown the right-image region. If it is determined by the region identifying unit 18 that the output shows the right-image region, then the selector 17 selects the number of right-image dots and presets the same to the dot-number counter 16. Then, the dot-number counter 16 counts down the read clock pulse output from the address counter 8. When the count of 0 is reached, the above output is identified by the region identifying unit 18 as the right-margin region. If it is determined by the region identifying unit 18 to be the right-margin region, then the selector 17 selects the number of right-margin dots and presets the same to the dot-number counter 16. Then, the dot-number counter 16 counts down the read clock pulse output from the address control unit 8. When finishing to store data of one line into the line buffer memory 11, the memory 11 outputs a line end signal.

During a period in which the output of the dot-number counter 16 is being identified by the region identifying unit 18 as the left-image region, the selector 10 selects image data from the frame memory 6 so as to be supplied to the line buffer memory 11. During a period in which the output is being identified by the region identifying unit 18 as the right-image region, the selector 10 selects image data from the frame memory 6 so as to be supplied to the line buffer memory 11. During periods other than the periods referred to above, the selector 10 does not select any image data from the frame memory 6, so that no image data is supplied to the line buffer memory 11. Accordingly, leftmost-extending blank data, left-extending image data based on an image signal, centrally-extending blank data, right-extending image data, and rightmost-extending blank data are arranged side by side in the line buffer memory 11.

The operation of the present embodiment constructed as described above will now be described below.

Let's now assume that images based on the image signals A, B are respectively recorded on left and right regions in a recording medium, a interlace system in which the image signal A has 48 effective scanning lines and an aspect ratio of 1:1 is used, and the remaining image signal B has 400 effective scanning lines and an aspect ration of 5:8.

Figure 2:
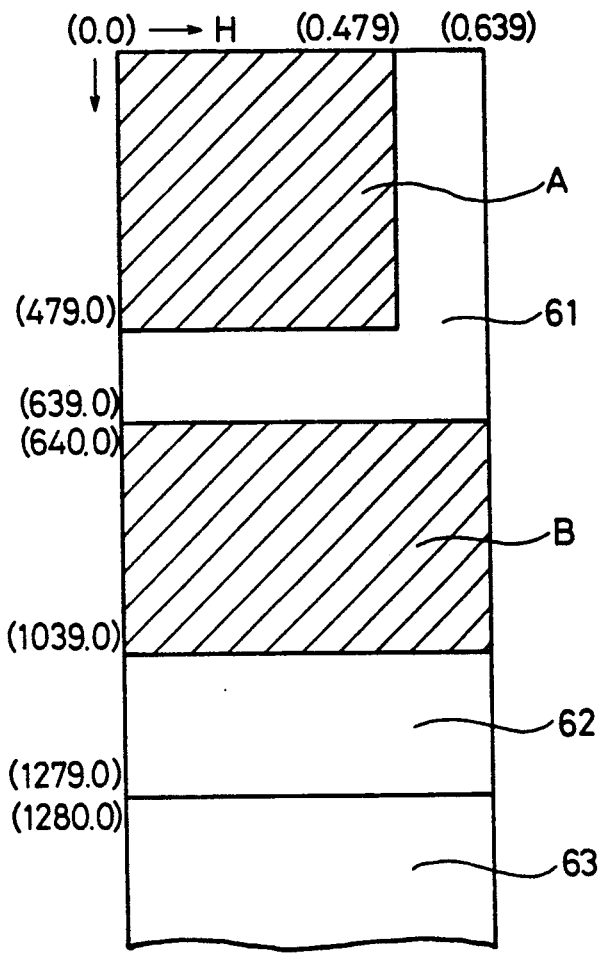
FIG. 2 is a diagram showing the manner in which data are stored in a frame memory employed in the embodiment shown in FIG. 1.

As shown in FIG. 2, the frame memory 6 is divided into first, second and third frame memory regions 61, 62, 63. For illustration, each address in each of the memory regions 61, 62, 63 is indicated by (V, H). Thus, the leading address of the first frame memory region 61 is indicated by (V, H)=(0, 0), the leading address of the second frame memory region 62 is indicated by (V, H)=(640, 0), and the leading address of the third frame memory region 63 is indicated by (V, H)=(1280, 0).

When the interlace system is used, a V address is set in such a manner that its odd field is counted as being 0, 2, 4, . . . , and its even field is counted as being 1, 3, 5, . . . . When the non-interlace system is employed, the V-address field is counted as being 0, 1, 2, 3, . . . .

Then, image signals output from the switching circuit 3 are A/D converted by the A/D converter 4. In addition, effective components of the so-converted image signals, which exclude a non-signal component corresponding to a blanking period, are A/D converted. Thereafter, effective image data corresponding to one effective horizontal scanning period is stored in sequence at one line address of the frame memory 6. Then, the selector 15 selects the write start address so as to be preset to the address counter 9. In the case of the first frame memory region 61, a preset address is indicated by (0, 0). Further, the address counter 9 is supplied with the sampling clock signal from the address control unit 8 as the write clock pulse. Since the image signal A has the 480 effective scanning lines and the aspect ratio of 1:1, i.e., the above-described interlace system is employed, A image data corresponding to one horizontal scanning period is stored at addresses (0, 0) to (0, 479). Then, when A image data corresponding to the next one horizontal scanning period is stored, the addresses are counted upward by two, and each H address is preset to zero by the selector 15. Thus, the A image data corresponding to the next one horizontal scanning period is stored at addresses (2, 0) to (2, 479). Similarly, respective image data are sequentially stored at their corresponding addresses over one frame. The A image data corresponding to one frame, which have been stored at the respectively corresponding addresses in the above-described manner, are indicated by an oblique line A in FIG. 2. When the image signal A is input, a space is left in the first frame memory region 61.

The image signal B is also electrically processed in the same manner as described above. Described specifically, B image data is successively stored in the second frame memory region 62. Since the image signal B has the 400 effective scanning lines and the aspect ratio of 5:8, B image data corresponding to a first one horizontal scanning period is stored at addresses (640, 0) to (640, 639). Then, B image data corresponding to the next one horizontal scanning period is stored at corresponding addresses. Thus, B image data are successively stored at respectively corresponding addresses over one field. Since the non-interlace system is used for the image signal B, it is unnecessary to carry out switching action of the odd field and the even field. The B image data corresponding to one field, which have been stored at the corresponding addresses in the above-described manner, are indicated by an oblique line B in FIG. 2.

After the image data have been stored in the frame memory 6 in the above-described manner, the frame memory 6 is placed in a reading state. In this condition, the output of the dot-number counter 16 is identified by the region identifying unit 18 as the left-margin region according to line start signal from the microcomputer 2. Then, the selector 17 selects the number of left-margin dots, i.e., 200 dots and presets the same to the dot-number counter 16. When the dot-number counter 16 counts down a clock pulse output from the clock pulse generator 14 by the number of the left-margin dots, i.e., 200 dots, the output of the dot-number counter 16 is identified by the region identifying unit 18 as the left-image region. Then, the selector 17 selects the number of left-image dots, i.e., 480 dots and presets the same to the dot-number counter 16.

During a period in which the output of the dot-number counter 16 is being identified by the region identifying unit 18 as the left-margin region, the selector 10 selects a non-input terminal side and successively writes white-dot information into the line buffer memory 11 by 200 dots in synchronism with the clock pulse.

If it is determined by the region identifying unit 18 that the output of the dot-number counter 16 has shown the left-image region, then the selector 15 selects a left-image read start address so as to be preset to the address counter 9. At this time, a preset address is indicated by (0, 0). Thus, the clock pulse output from the clock pulse generator 14 is supplied to the address counter 9 as a read clock pulse, so that A image data stored at a 1st line (addresses (0, 0) to (0, 479)) of the first frame memory region 61 is read. During this period, the region identifying unit 18 is activated to electrically connect the selector 10 to the output of the frame memory 6. Thus, the A image data read from the addresses (0, 0) to (0, 479) is written into the line buffer memory 11.

During this period, the dot-number counter 16 counts down the read clock pulse. When it counts 480 dots, the output of the dot-number counter 16 is identified by the region identifying unit 18 as the centrally-extending blank region. Consequently, the selector 17 presets the number of centrally-extending blank dots, i.e., 160 dots to the dot-number counter 16. When the dot-number counter 16 counts down the read clock pulse by the number of the centrally-extending blank dots, i.e., 160 dots, the output of the dot-number counter 16 is identified by the region identifying unit 18 as the right-image region. Thus, the selector 17 presets the number of right-image dots, i.e., 640 dots to the dot-number counter 16.

During a period in which the output of the dot-number counter 16 is being identified by the region identifying unit 18 as the centrally-extending blank region, the selector 10 selects the non-input terminal side and successively writes white-dot information into the line buffer memory 11 by 160 dots in synchronism with the clock pulse.

If the output of the dot-number counter 16 is identified by the region identifying unit 18 as the right-image region, then the selector 15 selects a right-image read start address so as to be preset to the address counter 9. In this case, a preset address is indicated by (640, 0). Thus, a read clock pulse is supplied to the address counter 9, so that B image data stored at a 1st line (addresses (640, 0) to (640, 639)) of the second frame memory region 62 is read. On the other hand, the region identifying unit 18 is activated to electrically connect the selector 10 to the output of the frame memory 6. Accordingly, the B image data read from the addresses (640, 0) to (640, 639) is written into the line buffer memory 11

During this period, the dot-number counter 16 counts down the read clock pulse. When the count reaches 640 dots, the output of the dot-number counter 16 is identified by the region identifying unit 18 as the right-margin region. Consequently, the selector 17 presets the number of right-margin dots, i.e., 120 dots to the dot-number counter 16. When the dot-number counter 16 counts down the read clock pulse by the number of the right-margin dots, i.e., 120 dots, data of one line is completed to be written into the line buffer memory 11 and line end signal is output to the microcomputer 2.

During a period in which the output of the dot-number counter 16 is being identified by the region identifying unit 18 as the right-margin region, the selector 10 selects the non-input terminal side and successively writes white-dot information into the line buffer memory 11 by 120 dots in synchronism with the clock pulse.

Figure 3:
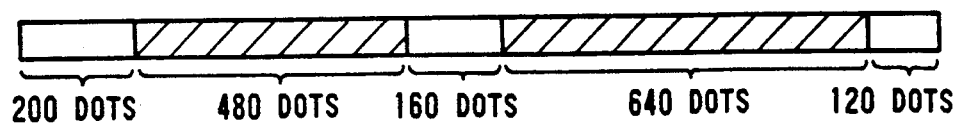
FIG. 3 is a diagram illustrating the manner in which data are stored in a line buffer memory employed in the embodiment shown in FIG. 1 based on specified arrangement information.

FIG. 3 shows the contents of the image information stored in the line buffer memory 11.

Then, the image data stored at a 2nd line of each of the first and second frame memory regions 61, 62 are read. This reading is carried out in a manner similar to the 1st line referred to above. However, the address counter 9 is preset to an address (1, 0) when the reading of the image data from the 2nd line of the first frame memory region 61 is initiated. The reading of the image data from the 2nd line is carried out until an address (1, 479) is read. When the reading of the image data from the 2nd line of the second frame memory region 62 is initiated, the address counter 9 is preset to an address (641, 0). The reading of the image data from the 2nd line thereof is performed until an address (641, 639) is read.

Figure 4:
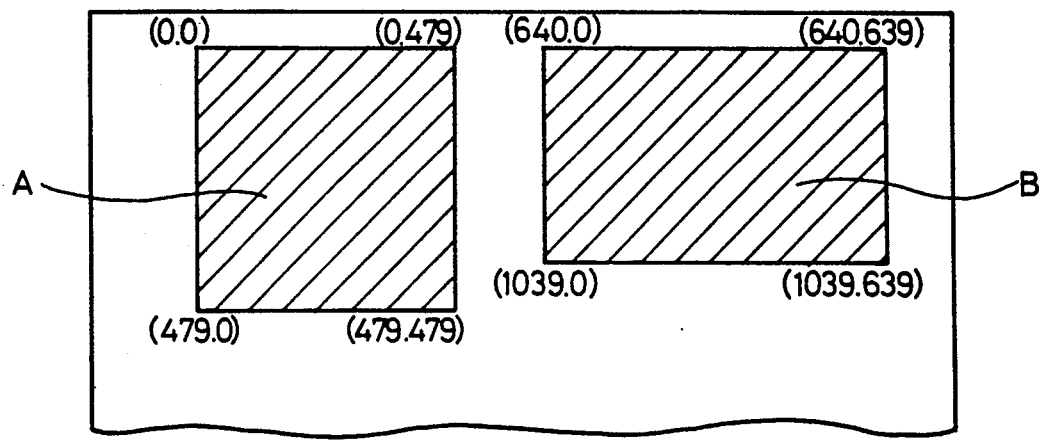
FIG. 4 is a diagram illustrative of image information recorded on a recording medium based on the specified arrangement information in the embodiment depicted in FIG. 1.

After the above reading has been completed in this way, the image data are recorded on the recording medium by the head 13 as shown in FIG. 4.

When only either the left-image region or the right-image region is shown after the image data reading has been carried out in the above-described manner, either the number of the centrally-extending blank dots or the number of the left-margin dots may be changed to read only data corresponding to one image.

Figure 6:
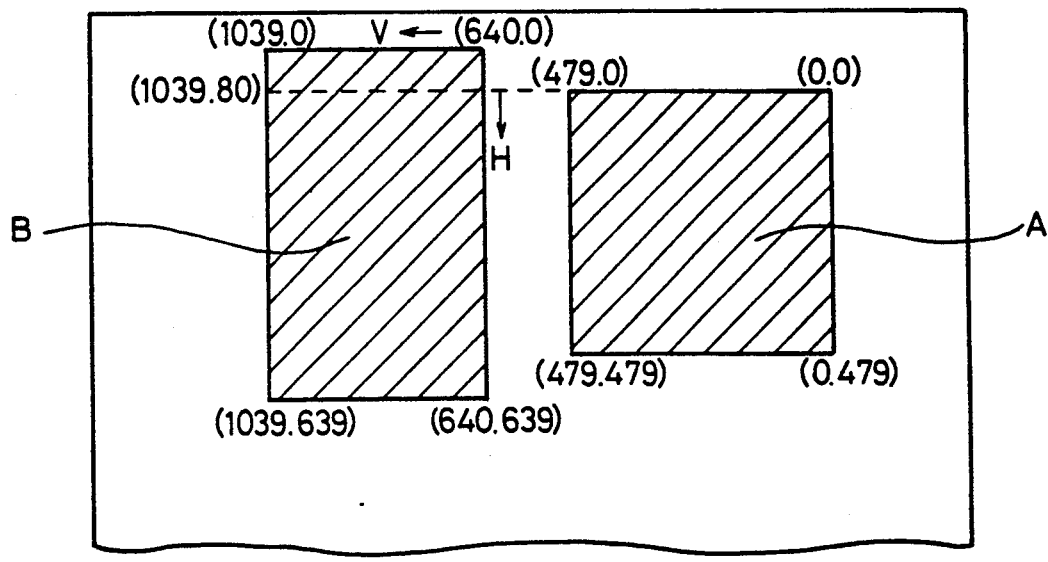
FIG. 6 is a diagram illustrative of image information recorded on a recording medium based on the specified arrangement information of FIG. 5 in the embodiment shown in FIG. 1.

When an instruction is made by the arrangement information specified by the setting device 1-1 of the control panel 1 in such a manner that the respective images are rotated clockwise through 90° from the state in which the images are arranged as shown in FIG. 4, thereby recording the image based on the B image data and the image based on the A image data on the left-handed and right-handed regions, respectively, of the recording medium, the A and B image data are read from the frame memory 6 in order referred to below as shown in FIG. 6.

1st line (1039, 0), (1038, 0) ... (640, 0)
2nd line (1039, 1), (1038, 1) ... (640, 1)

Figure 5:
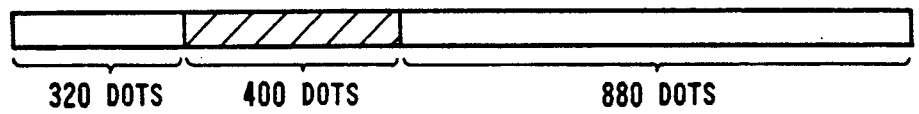
FIG. 5 is a diagram showing the manner in which data are stored in the line buffer memory employed in the embodiment shown in FIG. 1 based on another specified arrangement information.

At this time, each address preset to the address counter 9 is set in the following manner. Namely, the address counter 9 is activated to increment an (H) address by one for each line and to count down a (V) address, whereby each address may be specified to record images on the recoding medium. In this case, the number of left-margin dots and the number of centrally-extending blank dots regarded as the number of right-margin dots are set to 320 and 880 respectively for every lines between the 1st line and the 79th line to be described later. FIG. 5 shows the contents of data stored in the line buffer memory 11 with respect to data read from the respective lines between the 1st line and the 79th line.

Then, the reading of image data from the frame memory 6 is further carried out in order referred to below.

79th line (1039, 79), (1038, 79) ... (640, 79)
80th line (1039, 80), (1038, 80) ... (640, 80), (479, 0) (478, 0) ... (0, 0)
81st line (1039, 81), (1039, 81) ... (640, 81), (479, 1) (478, 1) ... (0, 1)

Figure 7:
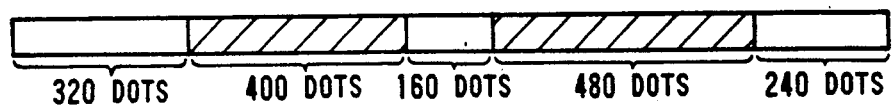
FIG. 7 is a diagram, different from FIGS. 3 and 5, showing the manner in which data are stored in the line buffer memory employed in the embodiment of FIG. 1 based on further specified arrangement information.

In this case, the number of the left-margin dots, the number of the centrally-extending blank dots and the number of the right-margin dots are set to 320, 160, and 240 respectively for each line subsequent to the 80th line. The contents of data stored in the line buffer memory 11 with respect to data read from the 81st line, for example, are illustrated in FIG. 7.

After the image data reading has been completed in this way, the image data are recorded on the recording medium by the head 13 as shown in FIG. 6. Described specifically, the image based on the image signal B and the image based on the image signal A shown in FIG. 4 are rotated clockwise through 90° respectively from the state in which the images are arranged as shown in FIG. 4, thereby recording the image based on the image signal B and the image based on the image signal A on the left-handed and right-handed regions, respectively, of the recording medium as shown in FIG. 6.

The image recording device according to the present invention can bring about the following advantageous effects.

Image data corresponding to each image is stored in a frame memory as a block. Each address to be read from the frame memory is then specified based on recording-image arrangement instruction information. It is therefore possible to record even images based on image signals, which are different in size and scanning form from one another, on desired image arrangement positions.

Having now fully described the invention, it will be apparent to those skilled in the art that many changes and modifications can be made without departing from the spirit or scope of the invention as set forth herein.

What is claimed is:

1. An image recording device for receiving successively-input image data therein so as to record a plurality of images based on said received image data on a single recording medium, said image recording device comprising:

a frame memory for storing said input image data therein;

specifying means for specifying information about attributes of said image data and image arrangement information on the recording medium;

a line buffer memory for storing therein image data read from said frame memory;

a dot-number counter for counting down a read clock of said frame memory in response to the number of margin dots preset thereto based on said attribute information and said image arrangement information specified by said specifying means before image data corresponding to each line with respect to an image specified at the leftmost position on the recording medium is read from said frame memory and/or after image data of said read image data, which corresponds to each line with respect to each image, has been written into said line buffer memory;

white image data storing means for storing white image data in said line buffer memory in synchronism with the read clock of said frame memory until the count of said dot-number counter reaches zero after said dot-number counter has started counting; and an address counter for counting up the read clock in response to an image read start address preset thereto when the count of said dot-number counter has reached zero, so as to specify an address for reading the image data corresponding to each line with respect to each image from said frame memory.

2. An image recording device according to claim 1, further comprising write controlling means for storing, at one line address of said frame memory, image data corresponding to one horizontal scanning period with respect to each image.

3. An image recording device according to claim 1, wherein said frame memory is used to store image data relative to each image therein as a group.

4. An image recording device according to claim 1, wherein the number of the margin dots preset to said dot-number counter represents the number of dots corresponding to a left margin on the recording medium and the number of dots corresponding to the width of a space between adjacent images on the recording medium.

* * * * *

UNITED STATES PATENT AND TRADEMARK OFFICE
CERTIFICATE OF CORRECTION

PATENT NO. : 5,253,081
DATED : October 12, 1993
INVENTOR(S) : Tsuyoshi Shoji, et. al.

It is certified that error appears in the above-indentified patent and that said Letters Patent is hereby corrected as shown below:

On the Title page, item [73], Assignee: should be --Juji Phot Film Co., Ltd. and Nagano Nihon Musen Kabushiki Kaisha--.

Signed and Sealed this

Twenty-eighth Day of June, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,253,081

DATED : October 12, 1993

INVENTOR(S) : Tsuyoshi Shoji, et al.

It is certified that error appears in the above-identified patent and that said Letters Patent is hereby corrected as shown below:

On the Title page, item [73], Assignee: should be --Fuji Photo Film Co., Ltd. and Nagano Nihon Musen Kabushiki Kaisha--.

Signed and Sealed this

Thirtieth Day of August, 1994

Attest:

BRUCE LEHMAN

Attesting Officer

Commissioner of Patents and Trademarks